United States Patent [19]

Sekikawa

[11] Patent Number: 5,150,305
[45] Date of Patent: Sep. 22, 1992

[54] NUMERICAL CONTROL SYSTEM PROVIDING GRAPHIC MACHINING SIMULATION

[75] Inventor: Katsuhide Sekikawa, Aichi, Japan
[73] Assignee: Mitsubishi Denki K.K., Tokyo, Japan
[21] Appl. No.: 438,988
[22] Filed: Nov. 20, 1989

Related U.S. Application Data

[63] Continuation of Ser. No. 309,969, Feb. 13, 1989, abandoned, which is a continuation of Ser. No. 612,948, May 23, 1984, abandoned.

[30] Foreign Application Priority Data

May 23, 1983 [JP] Japan ................................ 58-90334

[51] Int. Cl.$^5$ .............................................. G06F 15/00
[52] U.S. Cl. ........................... 364/474.26; 364/474.24
[58] Field of Search ................................ 364/188–193, 364/474.24, 474.26, 521, 522; 318/568.25; 434/234; 340/723

[56] References Cited

U.S. PATENT DOCUMENTS

| | | | |
|---|---|---|---|
| 4,490,781 | 12/1984 | Kishi et al. | 364/191 |
| 4,513,366 | 4/1985 | Munekata et al. | 364/171 |
| 4,519,026 | 5/1985 | Nozawa et al. | 364/189 |
| 4,521,860 | 6/1985 | Kanematsu et al. | 364/474 |
| 4,530,046 | 7/1985 | Munekata et al. | 364/171 |

FOREIGN PATENT DOCUMENTS

| | | | |
|---|---|---|---|
| 0826396 | 4/1981 | U.S.S.R. | 434/234 |
| 1051558 | 10/1983 | U.S.S.R. | 434/234 |
| 2140937 | 12/1984 | United Kingdom . | |

OTHER PUBLICATIONS

Rapid Assessment of Industrial Robots Performance by Interactive Computer Graphics; Heginbothan et al; 9th Inter. Sym. on Industrial Robots; Washington, D.C.; Mar. 13–15, 1979, pp. 563–574.
An Emulation System for Programmable Sensory Robots; Meyer; IBM J. Res. Develop.; vol. 25, No. 6; Dec. 1981; pp. 955–962.
Robot Task Planning: Programming Using Interactive Computer Graphics; Sjolund et al; Pro of 13th ISIR; 1983; pp. 7-122 to 7-135.
Integration of Design and Manufacturing Activities Based on Object Modeling; Kimura et al; Advances in CAD/CAM; North-Holland Publishing; IFIP 1983; pp. 375–385.
Proceedings of 17th Numerical Control Society Annual Meeting & Technical Conference, Apr. 27–30, 1980, Hartford, Conn., p. 2990320, Numerical control Society, Glenview, Ill., U.S.: L. O. Ward: "Computer verification of machine control data".
J.E.E. Journal of Electronic Engineering, vol. 19, No. 186, Jun. 1982, pp. 74–76, Tokyo, Japan; J. Suzuki: "Recent trends in raster-scan graphic displays".

*Primary Examiner*—Allen R. MacDonald
*Attorney, Agent, or Firm*—Sughrue, Mion, Zinn, Macpeak & Seas

[57] ABSTRACT

A numerical control system in which possible interference between tools can be checked on a graphics display unit and corrected, and complex workpiece and cutting path shapes are displayed without interference. In accordance with the invention, actual tool shapes in simplified form are displayed for checking interference. Two display memories are provided so that, while one of the display memories is being used for active display, data can be written into or erased from the other. When the data entry and removal is complete, the display memories are switched over so that the time during which portions of the displayed image disappear from the screen is reduced to a negligible length. The workpiece shape is displayed as a shaded area, and any area in which a tool tip interferes is eliminated during simulated machining of the workpiece.

2 Claims, 5 Drawing Sheets

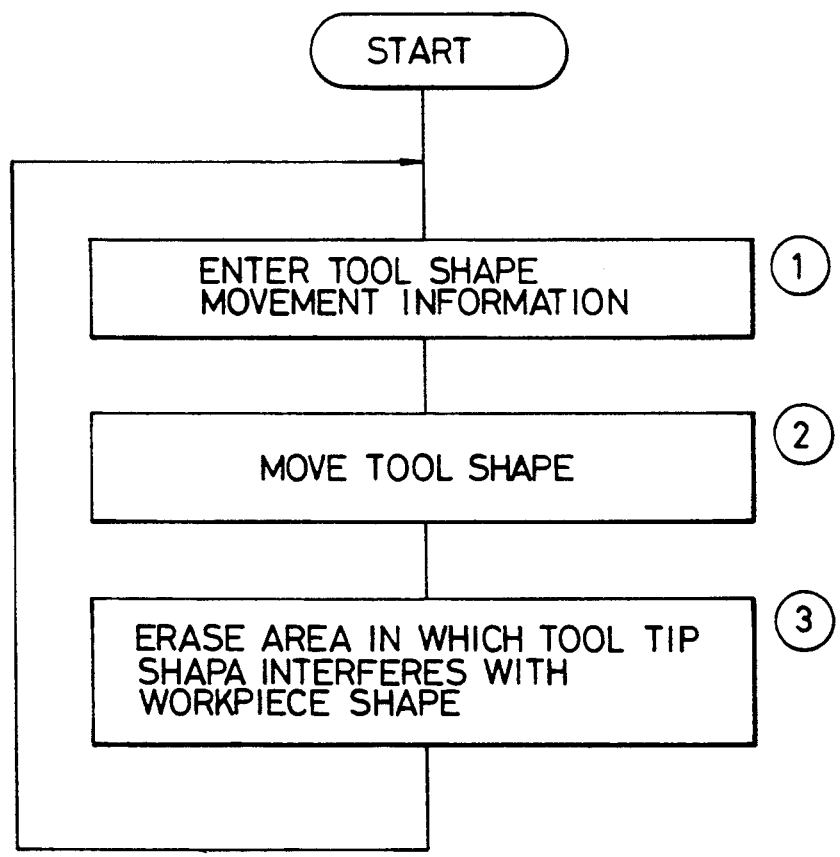

FIG. 6A  FIG. 6B  FIG. 6C
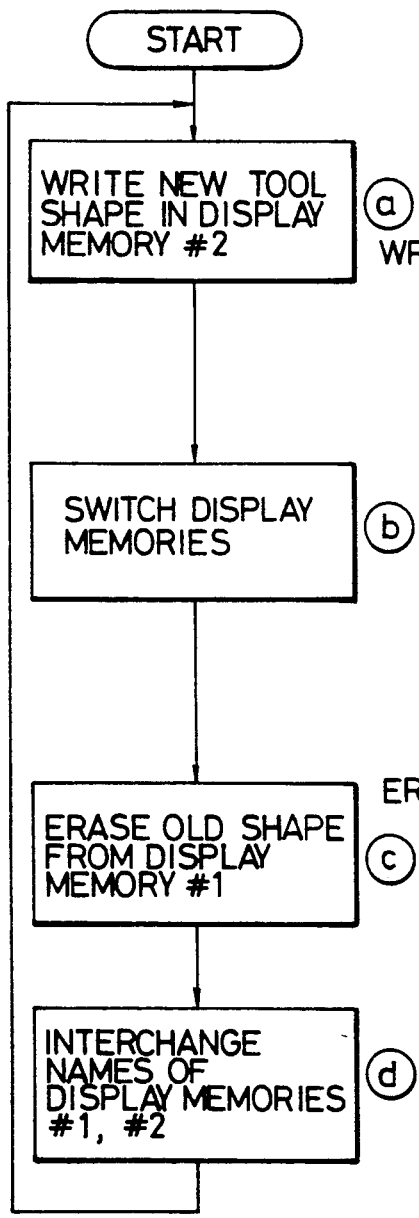
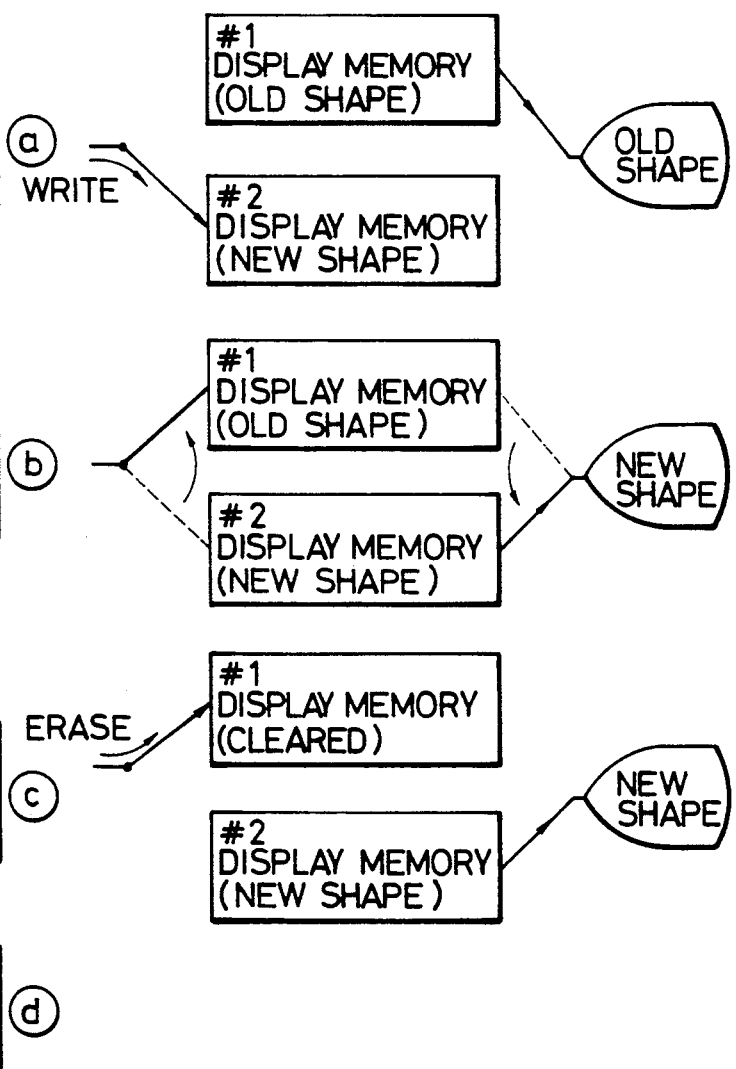

NUMERICAL CONTROL SYSTEM PROVIDING GRAPHIC MACHINING SIMULATION

This is a continuation of application Ser. No. 07/309,969 filed Feb. 13, 1989, now abandoned, which is a continuation of application Ser. No. 06/612,948, filed May 23, 1984, now abandoned.

BACKGROUND OF THE INVENTION

The present invention relates to an NC (Numerical Control) system, and more particularly to a graphics display unit for such an NC system.

NC systems control the position of a tool with respect to a workpiece according to numerical information indicative of the tool position for machining the workpiece. Such NC systems can machine workpieces of complex shape easily and highly accurately and increase the rate of production.

Graphics display units associated with the conventional NC systems display the current tool position, the machining path of the tool, machining information of the workpiece and other parts, for checking a machining program and monitoring machining conditions. Such a graphics display unit will be described with reference to FIG. 1 of the accompanying drawings.

In FIG. 1, a tool tip mark 11 at a program original point $Q_0$ is indicative of the position of a tool and can be moved by entering movement information to erase a currently displayed tool tip mark 11 and display a new tool tip mark 11 at new coordinates. The types of movement between the new and old coordinates can be displayed according to the line type (cutting feeding is indicated by the solid lines 1 and positioning by the dotted lines 2 in FIG. 1). As a result, paths of movement of the tool are displayed as shown in FIG. 1 for enabling program checking and machining condition monitoring. Denoted at 3 in FIG. 1 is the base line.

The conventional graphics display unit thus constructed has suffered the following disadvantages:

1) Since the tool tip mark 11 indicative of the current tool position is symbolically displayed, it is not possible to determine whether the tool tip interferes with a workpiece 10 and holder mechanisms such as a tailstock and a chuck (not shown).

2) With the tool tip mark 11 moved in the foregoing manner, the tool tip mark 11 momentarily disappears from the graphics display unit, and appears to flicker while it is moving.

3) The display of a workpiece shape and cutting paths in superposed relation allows determination of which portion of the workpiece shape is to be machined. When cutting paths become complex, they sometimes are displayed as being superposed on themselves, and cannot easily be confirmed.

SUMMARY OF THE INVENTION

The present invention has been made to overcome the foregoing difficulties. It is an object of the present invention to provide a numerical control system having the following features: 1) No symbolic display such as the tool tip mark 11 is utilized, but an actual tool shape 12a as shown in FIG. 2A is displayed in a simplified configuration as shown in FIG. 2B, so that any interference with the workpiece (FIG. 1) and the holder mechanisms such as the tailstock and the chuck (not shown) can be confirmed. 2) Two display memories are used in such a manner that while one of the display memories is used for display, data is written into or erased from the other display memory. When such data entry and removal is completed, the display memories are switched over, so that the time during which the tool tip mark or tool shape disappears can be reduced to a negligible length, thus providing flicker-free graphics display. 3) The workpiece shape is displayed as a shaded image 20 (hereinafter also referred to as a "plane image") 20, and any area in which the tool tip shape 13 of a tool shape 12b as moved interferes with such plane image is eliminated during simulating machining of the workpiece 10 on the graphics display unit.

BRIEF DESCRIPTION OF THE DRAWINGS

FIG. 5 is a flowchart of a processing procedure according to the present invention;

FIGS. 6A, 6B and 6C are a flowchart of steps of moving a tool shape, processes of writing and erasing data into and from display memories, and displayed images on a CRT, respectively.

DESCRIPTION OF THE PREFERRED EMBODIMENTS

The present invention will hereinafter be described in detail.

Figure 4:
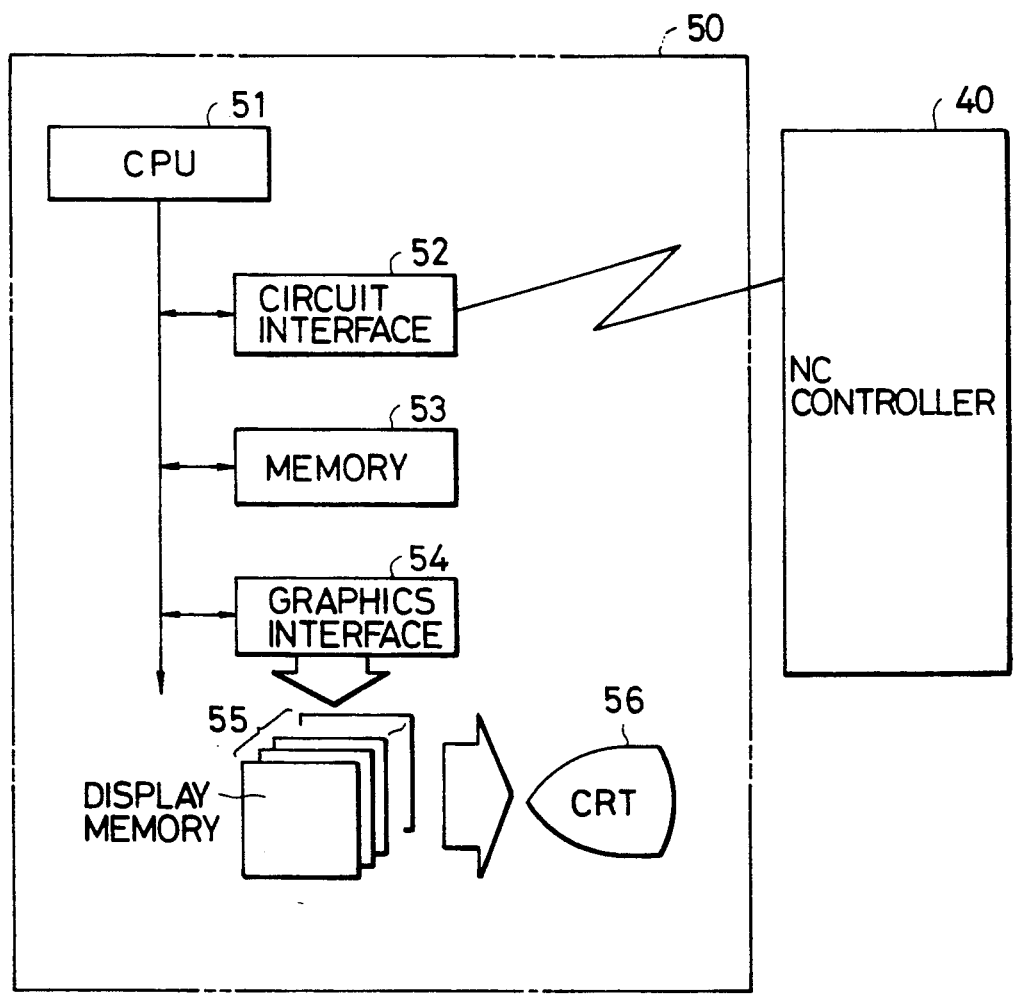
FIG. 4 is a block diagram of a graphics display unit.

FIG. 4 is a block diagram of an NC system according to the present invention. Display data issued from an NC controller 40 are stored through a circuit interface 52 into a memory 53 in a graphics display unit 50. The graphics display unit 50 has a CPU 51 for processing the displayed data, issuing a command to a graphics interface 54, and displaying a graphics pattern on a CRT 56 through display memories 55.

A preferred embodiment of the present invention, as incorporated in a lathe, will be described with reference to FIG. 5.

FIG. 5 is a flowchart of operations of the preferred embodiment of the invention, the flowchart including steps 1 through 3.

Tool shape and tool movement information are entered into an input unit at a step 1, and a tool shape 12 is moved according to these data entered in the input unit at a step 2. Then, an area in which a tool tip shape 13 interferes with a work shape is eliminated at a step 3.

Figure 1:
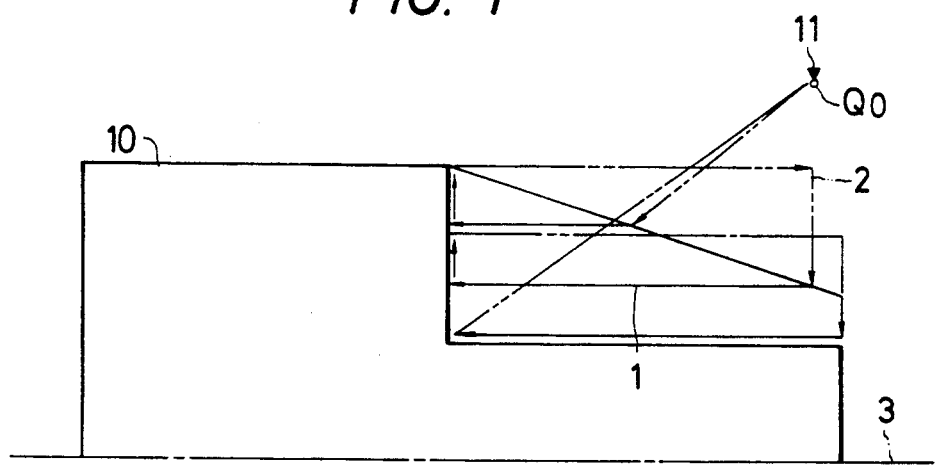
FIG. 1 is a diagram showing a conventional manner of displaying machining information.
Figure 2A:
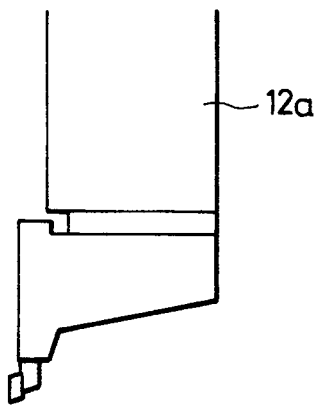
FIGS. 2A and 2B are diagrams illustrative of tool shape conversion.
Figure 2B:
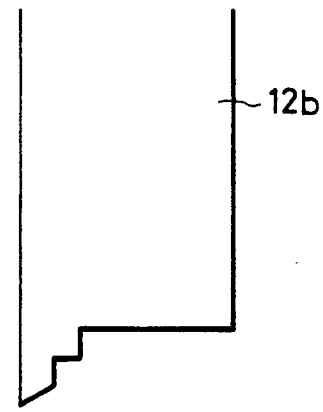
Figure 3:
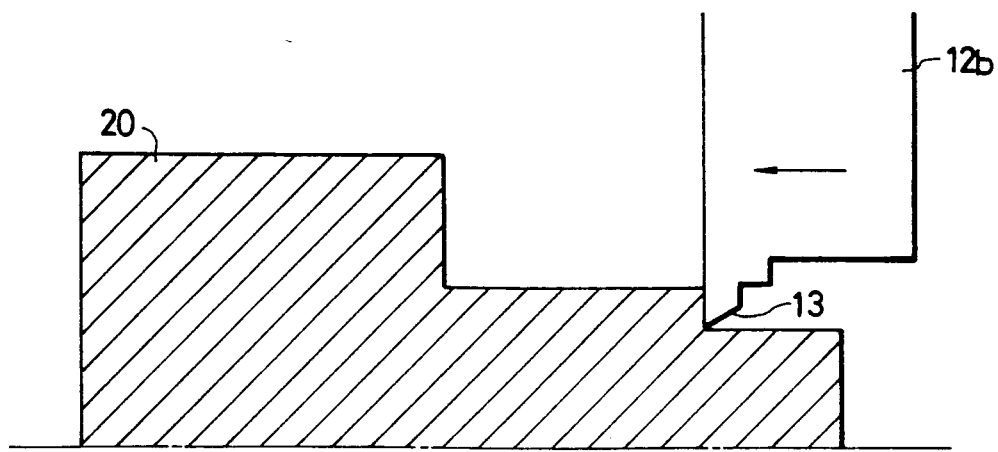
FIG. 3 is a diagram showing the manner in which a workpiece is displayed.

FIGS. 6A, 6B, and 6C are flowcharts of operations of moving the tool shape 12b. FIG. 6A shows successive steps a through d, FIG. 6B respective processes, and FIG. 6C displayed shapes on the CRT 56. More specifically, the tool shape 12b is written at a new position in a display memory No. 2 at a step 1. As shown in FIGS. 2A and 2B illustrative of a lathe tool by way of example, the tool shape 12b used is a simplified form converted from the actual tool shape 12a. As many tool shapes 12b as there are tool types are registered in a tool pattern file so that a desired one can be accessed and also displayed on the CRT 56 simply by specifying the identification symbol therefor.

Then, to display a newly written graphics pattern, the display memories are switched over at a step b and the display memory No. 1 with no pattern being currently displayed is erased at a step c. Thereafter, the names of the display memories are changed at a step d. The above steps a through d are repeated to move the tool shape.

The third step shown in FIG. 5 will be described with reference to FIGS. 7A and 7B.

Figure 7B:
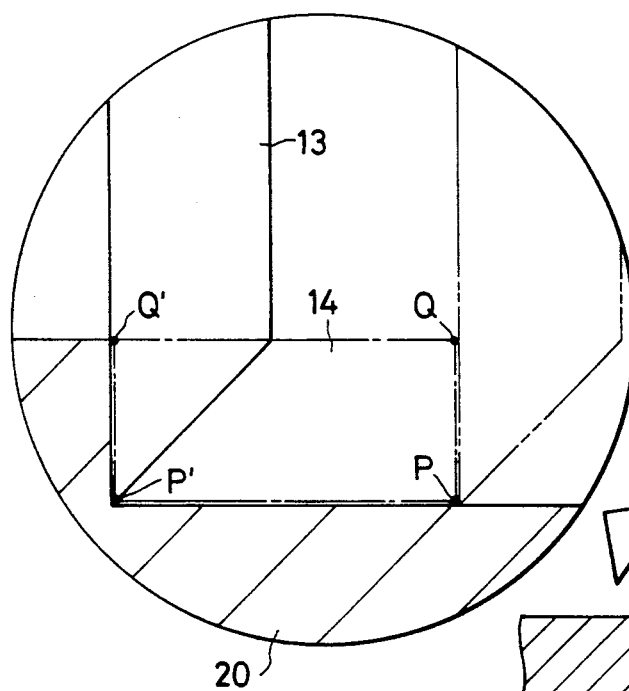
FIGS. 7A and 7B are diagrams illustrative of simulated workpiece machining.
Figure 7A:
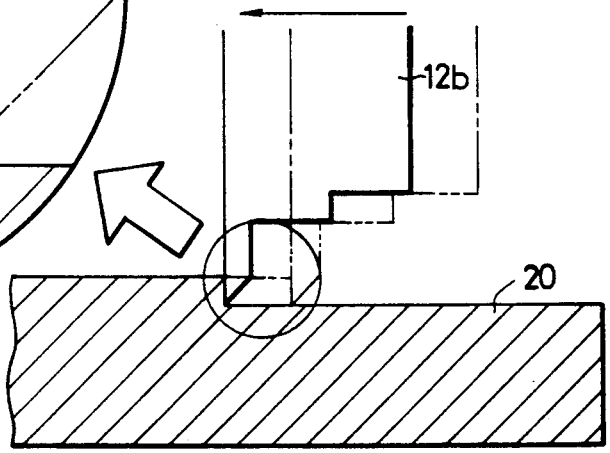

FIG. 7A is a diagram illustrative of simulated workpiece machining, and FIG. 7B is an enlarged view of a circled portion in FIG. 7A. As the tool tip shape 13 which is a portion of the tool shape 12b moves, there is created an area 14 in which the tool tip shape 13 interferes with a workpiece shape as displayed. Only the interference area 14 is erased from the workpiece shape. The interference area 14 can be specified by four points, a tool position P, a cutting point Q, a tool position P', and a cutting point Q', the latter two being taken after the tool shape has been moved. The cutting point Q is determined by specifying a distance to be cut during cutting operation.

The steps 1 through 3 in FIG. 5 are repeated to move the tool shape 12b while machining the shaded image 20 on a simulated basis.

While in the foregoing embodiment the present invention has been described as incorporated in a lathe, the invention is also applicable to a two-dimensional display in a graphics display system for a machining center.

With the present invention, as described above, a tool shape and a workpiece shape are displayed, and an area in which the tool shape as moved with respect to the workpiece shape interferes with the workpiece shape is erased. Two display memories are employed in such a manner that while one of the display memories is used, data is written into and erased from the other display memory, and when such data storage and removal is completed, the display memories are switched over. Therefore, any interference of the tool with the workpiece and the holder mechanisms can be checked, and the workpiece can be machined in a simulated fashion on the graphics display unit. The condition of the workpiece being machined and its finished shape can be confirmed without having to actually machine the workpiece, and any display flicker can completely be eliminated during tool shape movement.

I claim:

1. A numerical control system comprising:
    a controller for controlling a machine tool and a graphics display unit connected to said controller, said graphics display unit comprising:
        a circuit interface for entering display data from said controller;
        a memory for storing said display data through said circuit interface;
        a central processing unit for issuing commands to a graphics interface in accordance with said display data;
        display memories for storing graphics patterns; and
        a CRT for displaying said graphics patterns from said display memories in accordance with said commands;
    said central processing unit processing said graphics patterns in said display memories through said graphics so as to display a workpiece shape as a shaded image on said CRT in accordance with a first user selection, a tool shape with said workpiece shape on said CRT in accordance with a second user selection, and movement of said tool shape on said CRT;
    said numerical control system further comprising means for machining the workpiece in a simulated fashion in accordance with said movement of said tool shape with respect to said workpiece shape on said CRT so as to change a shape of said shaded image in said display memories based on calculations by said central processing unit;
    said central processing unit further processing said graphics patterns so as to remove, from said CRT, an interference area in which a tool tip shape of said tool shape interferes with the workpiece shape displayed as the shaded image as simulated machining of said workpiece by said tool shape proceeds.

2. The numerical control system according to claim 1, wherein said display memories comprise first and second display memories for alternately displaying said tool shape and said workpiece for said simulated machining, one of said first and second display memories displaying said tool shape and said workpiece while contents of the other display memory are altered in accordance with removal of said interference area and movement of said workpiece, said central processing unit alternately switching over said first and second display memories through said graphics interface to display said simulated machining.

* * * * *